Jan. 1, 1952
M. C. TAYLOR
2,581,311
DRILLER
Filed Jan. 13, 1945
2 SHEETS—SHEET 2
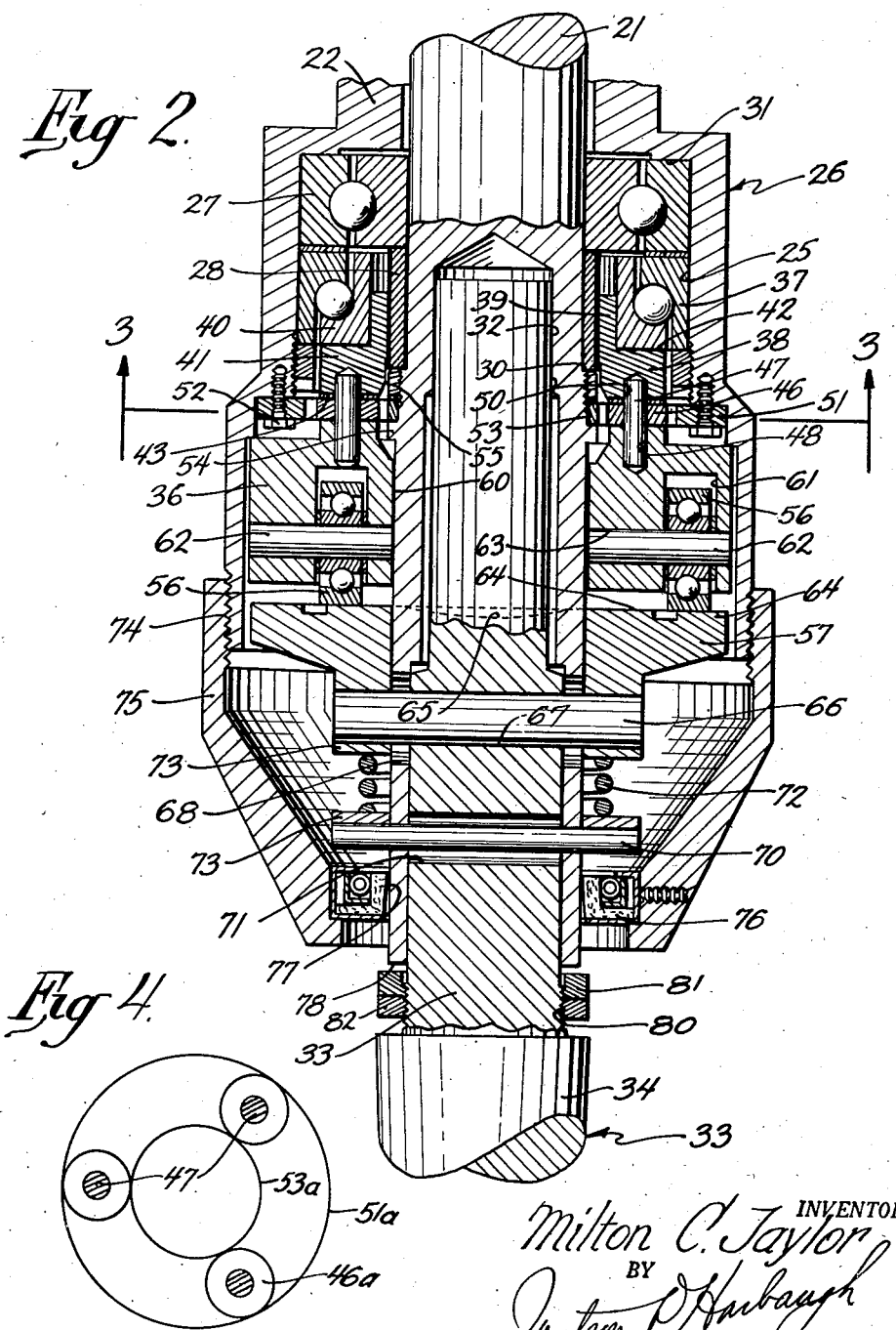
INVENTOR.
Milton C. Taylor
BY
Watson D. Harbaugh
Atty.

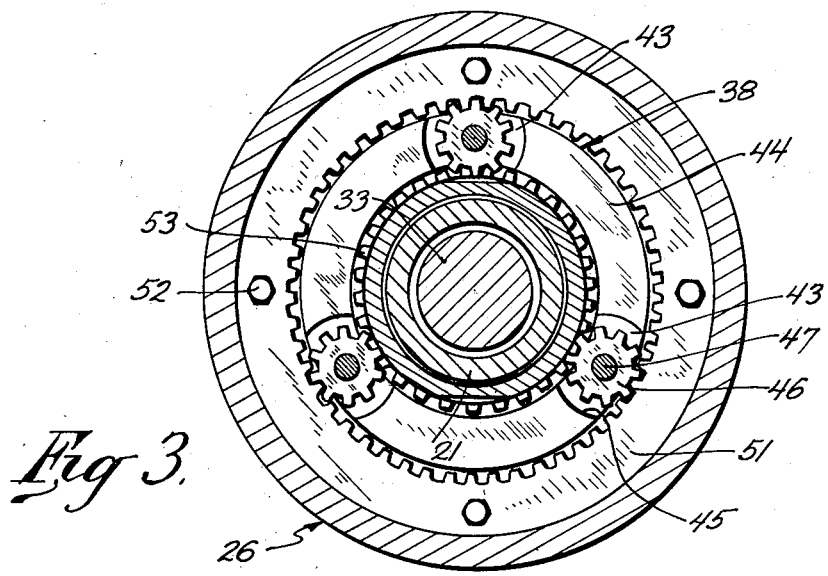
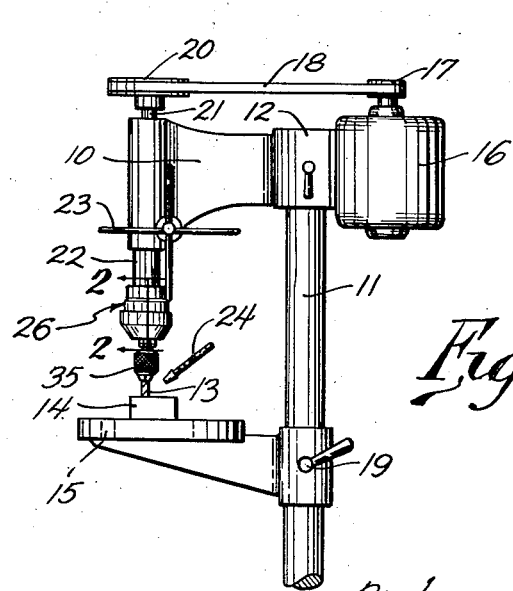

Patented Jan. 1, 1952

2,581,311

UNITED STATES PATENT OFFICE 2,581,311

DRILLER

Milton C. Taylor, Chicago, Ill., assignor, by mesne assignments, to Ex-Cell-O Corporation, Detroit, Mich., a corporation of Michigan Application January 13, 1945, Serial No. 572,710

6 Claims. (Cl. 77—32.3)

The present invention relates to the drilling of materials such as metals and plastics ductile enough that a shaving such as a chip, progressively cut from the material such as by a twist drill does not break under the cutting strain imposed upon it by the cutting edges of the drill cutting into the material.

The present invention is an improvement in certain respects over the invention disclosed in the Karweit application Serial No. 468,399, now Patent No. 2,501,177, issued March 22, 1950, reference to which is hereby made. Also of interest to the present invention is the Karweit application Serial No. 492,373, now Patent No. 2,562,040, issued July 24, 1951, to the extent that it may be desirable to understand the operation of the cutting edges of a drill when oscillated rapidly along the axis of drill rotation during drilling. Reference is particularly made to the Karweit application Serial No. 484,612 for a more detailed discussion of this principle of drilling, as used with a twist drill having two cutting edges.

Generally speaking, however, twist drills which are representative of many types of drills with which the invention will operate are so-called because one or more grooves, usually two, are spirally formed in the body of the drill between the point and the shank, as by twisting a flat strip of metal or by milling a bar of steel to provide spiral channels for the movement of chips and lubricant lengthwise to the drill.

As the twist drill is thus formed, a column of stock generally referred to as a web is disposed along and at the axis of rotation of the drill centrally between the channels or flutes. The portions which extend outwardly from the web to the periphery of the drill upon both sides of the web are called lands. The end of the lands at the point of the drill are ground at an angle to the axis of the drill to provide cutting edges or lips equal in length and equally inclined so that the cutting edges define a surface of revolution comprising a flat cone when the drill is rotated.

The drilling of a hole is accomplished by the cutting edges. These edges, when the drill is rotated and fed into the work piece, simultaneously cut along spiral paths if they are sharpened correctly. The cutting edges remove from the work piece at the bottom of the hole a ribbon of material identified as a chip.

In conventional drilling the chip is attached to the work piece ahead of each cutting edge and being short sided on the inner edge curls and rotates in the flutes as well as with the drill as it creeps through the flute from the cutting edge to the mouth of the hole. Before the oscillation principle of drilling was discovered, it was expected and considered to be desirable that the chip from each cutting edge be one continuous ribbon from the cutting edge to the mouth of the hole to keep the chip moving along the drill flutes. Considering then the length, nature and size of the conventional chips; and also the fact that the chips are work-hardened when formed; and that a drill generally rotates at a high speed, it will be appreciated how the chips with conventional drilling practices badly scar the wall of the hole and cause friction which generates sufficient heat to rob the lubricant of its coolant character by the time it reaches the cutting edges.

Rapid oscillation of the drill during drilling eliminates this and also the danger present with conventional chips swinging wide at great speed as they leave the mouth of the hole and splattering lubricant over the work, the machine and the operator. The chips formed by this method of drilling are broken into small sections at the cutting edges of the drill and do not fly tangentially at a high velocity as dangerous missiles. Furthermore, the chips as broken up do not jam in the flutes but move loosely out and permit cool lubricant to reach the cutting edges of the drill. In this method of drilling, the drill, during the time that it is being fed into a work piece under a main feed pressure is oscillated momentarily a distance sufficient to break up the chips every so often. This takes place within a minor portion of a revolution, preferably less than 90° and is repeated as often as once each revolution, as by a cam follower arrangement. The drill is provided with a feed pressure and this feed pressure is relaxed and the drill retracted several thousandths of an inch momentarily. In the instances where the cam and follower are used and rotated with respect to each other at the same relative speed that the drill rotates with respect to the work piece, the oscillation recurs at the same point of relative rotation between the drill and work piece, and although this point can be varied by rotating the work piece as described in the application Serial No. 484,612, now Patent No. 2,453,136, issued November 9, 1948, already mentioned, or, may be varied by an independent motor drive operating the oscillator directly, or, by bevel gearing as disclosed in an application Serial No. 498,314, now Patent No. 2,361,120, issued June 7, 1951, it may not be possible in some instances to rotate the work piece, or provide a motor drive or a bevel gearing as mentioned. Therefore, the present invention solves the difficulty by providing a planetary drive between a non-rotary part and a rotating part to progressively advance one of the two cam and follower members with respect to the other, preferably one and one-half times between oscillations. Such a transmission can be readily installed upon the drillers disclosed by Karweit without materially changing their assembly and can be incorporated in future Karweit drillers whether the drillers are built either as an attachment for a drill press or are built into the spindle and quill construction of drill presses.

One of the objects of the present invention is to eliminate the possibility of "run-out," i. e. a deviation from perfect alignment, which has been experienced sometimes with and without Karweit drillers which run-out occurs when an improperly sharpened drill is being used. This run-out occurs where one cutting edge engages the work a little sooner or over a greater length than the other cutting edge. The drill thus has a tendency to cut off-center which if permitted to recur at the same relative position in the work piece when a Karweit driller is used, will cause a drill point to shift laterally in the same direction each time.

It is known that an improperly sharpened drill cuts sufficiently over size that the possibility of run-out is ever present. When a properly sharpened drill is used with the Karweit driller, the hole cut is exceedingly close to size. With such tolerances the cut made by the drill serves as a bushing to keep the drill in alignment. However, where one cutting edge of the drill is a little longer than the other, this causes a slight wabble of the point of the drill, and this wabble is magnified in succeeding revolutions if it recurs at the same point each time because the heavier cutting edge, after each oscillation, re-engages the work to pick up a heavier cut than the lighter cutting edge had to pick up. This trouble is not experienced, however, with the Karweit driller when the point of oscillation is varied with respect to the work piece.

In the preferred embodiment of the invention the oscillation is positively stepped to recur every one and one-half turns so that successive tendencies to deviate cancel each other and a hole true to size and alignment is provided.

This being among the objects of the invention, other and further objects will become apparent from the appended claims, the drawings, and the description relating thereto.

In the drawings:

Fig. 1 is a side elevation of a drill press embodying one form of the invention.

Fig. 2 is an enlarged vertical section taken of the lower portion of the quill of the drill press shown in Fig. 1 as taken upon line 2—2 thereof.

Fig. 3 is a section taken upon a line 3—3 in Fig. 2, and

Fig. 4 illustrates the preferred planetary gear ratio to provide the best results within the objects of the invention.

The drill press head 10 as shown in Fig. 1 is slidably mounted upon a standard 11 to be locked in predetermined height by a split sleeve arrangement 12 so that a drill 13 may be located vertically with respect to a work piece 14 that is disposed upon a work table 15 held in place by a clamp 19.

As viewed in Fig. 1, a motor 16 is mounted to the right of the standard 11 and provided with a pulley 17 driving a V belt 18 which in turn drives a pulley 20 secured to the upper end of a spindle 21 journaled in the head 10 that is disposed to the left of the standard.

The quill 22 is reciprocably mounted in the head 10 for forward and reverse traverse movements as controlled by a manual throw 23. The word "quill" as used in the description and claims contemplates any suitable feed traversing element or unit including an automatic feed which can be substituted for a manual throw or a drill head traverse such as used in automatic drillers. A lubricant line 24 is provided to supply a flow of lubricant as desired to cool the drill and wash away chips brought out of the hole by the drill.

The embodiment of the invention illustrated in Figs. 2 and 3 comprises an arrangement wherein the mechanism embodying the invention is mounted in a cavity 25 provided for that purpose in an enlarged portion or head 26 formed in the lower end of the quill 22. The spindle 21 is journaled at its upper end in the quill by a spindle bearing (not shown). At its lower end the spindle 21 is held in place by means of a radial contact frictionless bearing 27 received in the lower end of the quill to rest against the sleeve 28 as supported on the spindle by shoulder 30, and in the head 26 against the shoulder 31.

The lower end of the spindle is bored and preferably held to close tolerances as at 32 to receive for axial movement a driven member 33 tapered as at 34 at its lower end to receive the drill chuck 35 (Fig. 1) which supports the drill 13.

Below the radial contact bearing 27 a follower cage 36 is mounted in the head and supported for relative rotation with respect to the head 26 upon an angular contact frictionless bearing 37 by means of a collar 38 having a cylindrical flange 39 received within the inner race 40 of the bearing 37 and a radial portion 41 providing a shoulder 42 resting against the end of the inner race 40 to transmit thereto end thrust pressures.

As more particularly shown in Fig. 3 the collar 38 on the face 43 opposite to the shoulder 42 is provided with raised sections 44 extending downwardly into contact with the cage 36 to provide an endthrust shoulder with the cage 36. The portions 44 are cut away as at 45 to provide cages for planet gears 46 received therein upon pins 47. The pins are press-fitted into holes 48 in the cage 36 at one end and are received at the other end in holes 50 in the radial flange 41 of the collar 38. With this construction the cage 36 is supported against endthrust pressures upon the inner race 40 of the endthrust bearing 37 through the flange 41 of the collar 38. The cage is thereby free to rotate with respect to the shaft 21 and also the quill 22.

As will be seen in Fig. 2 the gear teeth of the planet gears 46 extend radially in both directions beyond the contour of the collar 38 and the cage 36. At this level a ring gear 51 is disposed in mesh with the planet gears 46 as secured to the housing 26 by bolts 52. A sun gear 53 is secured to the spindle 21 against a suitable flange 54 by a lock nut 55 threaded to the spindle 21. With this arrangement of the sun gear 53, the planet gears 46 and the ring gear 51, relative rotation between the spindle 21 and the housing 26 will cause the planet gears 46 to rotate about the shafts 47 and also carry the shafts 47 bodily around the axis of rotation of the spindle 21 to rotate the cage 36 at a reduced speed with respect to the speed of the spindle 21.

Two followers 56 are disposed upon opposite sides of the axis of rotation so that the thrust load carried by them and a cam 57 is substantially balanced to prevent any cocking or binding that otherwise might occur between the reciprocating parts under heavy feed pressures. Thus the thrust load of any feed pressure existing between the quill 22 and the chuck 35 can be borne in either one of two ways against the shoulder 31; namely, (1) through the cam and follower arrangement, the frictionless endthrust bearing 37 and the outer race 27 of the radial contact bearing 27, or (2) the pressure can be borne directly through the inner race of the radial contact bearing 27 as carried by the shoulder 30 through the sleeve 28.

The follower cage 36 can be carved out of rod stock or be die made. In either case the part is provided with a central opening 60 large enough to receive and clear the spindle 21. Cavities 61 are provided in the body portion of the cage to receive the frictionless bearing followers 56 which may be mounted upon radially disposed pins 62 received in bores 63 provided for them in the walls of the cavities. The cavities 61 are spaced from the axis of rotation at different radial distances so that the followers track radially spaced paths. The followers can also be made as solid wheels if desired.

Cooperating with the followers is the cam 57, centrally apertured to clear the spindle 21. The cam has two concentric tracks 64 to serve as paths for the followers 56, one track for each of the followers. At diametrically opposite points dips or cam depressions 65 are provided in the tracks, one for each track, so that the cam will be permitted to move upwardly once each relative revolution between the follower and cam when the dips coincide with the position of the followers.

The cam 57 is mounted on the quill driven member 33 by means of a pin 66 which is press fitted into the quill driven member as at 67 and received in the elongated slots 68 upon the spindle so that the pin provides a rotary drive between the spindle and the quill driven member and does not interfere with the reciprocation of the quill driven member in the spindle. Below the cam 57 another pin 70 is provided which is press-fitted into the spindle member and is received in an axially elongated aperture 71 through the quill driven member so that it does not interfere with the reciprocation of the spindle and the quill member. Between the two pins 66 and 70 is received a compression spring 72 supported at both ends by washers 73 resting against the pins. This spring urges the cam 57 and quill member 33 upwardly to the upper limit permitted to these two parts by the cooperating positions of the cam and followers.

The lower end of the quill is threaded as at 74 to receive the grease cover 75 having the grease seal 76 which engages the smooth outer surface of the spindle member as at 77. With this construction the spindle member 21 extends all the way through the assembly to terminate in an end shoulder indicated at 78 disposed slightly beyond the lower extremity of the grease cover 75. Below this shoulder 78 on the spindle, the quill member is provided preferably with a right thread 80 upon which is threaded an adjusting nut 81 and a locknut 82. With this arrangement open end wrenches can be readily located upon the hex faces of the nuts 81 and 82 and the reciprocation action of the quill and spindle members controlled by turning the adjusting nut in either direction. A right hand turn narrows the range of reciprocal movement while a left hand turn widens the range of reciprocal movement permitted to the spindle and quill members under the control of the cam and followers. Furthermore, in event that it is desired that the reciprocation or oscillation be completely removed, a complete right hand turn causes the feed pressure to be borne directly through the sleeve 28; namely, from the quill member through the shoulder 78 and into the housing 22 by means of the shoulder 31 supporting the bearing 27.

Lubricant passages for the movement of fluid lubricant to the reciprocating parts and the frictionless bearing parts are provided wherever required.

Whenever the adjusting nut 81 is set to permit oscillation, the cam and follower arrangement momentarily oscillates the drill periodically when the cam moves to the upper limit permitted to it by either the depth of the dip on the cam or the limit of movement imposed upon the system by the adjusting nut 81. The setting need be no greater than that required to terminate the chips being formed. This oscillation thereby cuts the chips free from the work at predetermined times to comminute them to a predetermined size as the drill progressively cuts deeper and deeper into the work. For this purpose, the spring 72 should be sufficiently strong to assure that the drill reciprocation follows the contour of the cam to the extent that it is permitted to do so in the system, having also in mind the weight inertia of the reciprocating parts, the speed of rotation, and the depth provided by the adjustment of the nut 81. This adjustment is made by the operator who can easily set the system according to the criteria mentioned. Furthermore, the construction described can be embodied in an attachment.

As the drill 13 is rotated and fed into the work piece 14 the follower cage 36 progresses in this same direction as rotated by the planetary system described but at a much slower speed, said speed being determined in relationship to the gear ratio provided in the planetary system. Because of this advancing movement of the followers the cam dip 65 is narrowed to a range below 90° of a revolution and the cutting action of the drill is or can be sustained for a major portion of a revolution including a full revolution or a distance greater than a full revolution between oscillations depending upon the gear ratio of the planetary system.

The preferred ratio is shown in Fig. 4 where the planet gears 46a are carried one-half of a revolution every one and one-half revolution of the sun gear 53a while the ring gear 51a is held stationary. This ratio is attained where the planet gears are one-half the diameter of the sun gear. The oscillation thus occurs every one and one-half revolution of the drill so that the cutting edges of the drill exchange relative positions with respect to each other each successive oscillation from that occupied by them the preceding oscillation. Thus, any tendency of one cutting edge to cut off center in any one oscillation is repeated the next oscillation at a diametrically opposite position to counteract for the effect occuring the first time. This counteraction continues the full length of the cut and also without expense to rapid chip removal increases the relative effective cutting time of the drill and reduces silghtly the rapidity of the vibration. In such an arrangement the cam dip would be approximately 40° to give an effective oscillation of 60°, or 60° to give an effective oscillation of 90° if that length of time was desired.

However, oscillation at other periods than once every one and one-half revolutions has certain advantages as outlined because any tendency for the drill to run out is distributed around the cutting circle rather than permitted to recur at the same point each time. The period of oscillation recurrence can be varied over three revolutions if desired so long as the chips are small enough to clear the flutes but large enough to prevent packing at the speed and for the material being drilled.

In this way chips are comminuted to uniform independent particles at the cutting edges of the drill as fast as the cut progresses, and the particles find their way out through the drill flutes quite easily without need for indulging in the conventional practice known as "step drilling" where the drill is retracted completely from the work to clear the chips packing in the flute.

Consequently, although several embodiments of the invention have been disclosed and described, it will be readily apparent to those skilled in the art in view of the objects and determinants discussed herein, how various and further changes and modifications can be made in the invention without departing from the substance thereof the scope of which is commensurate with the appended claims.

What is claimed is:

1. A device for drilling a machinable material comprising a rotary drive member, a rotary driven member, means of oscillating said members with respect to each other retractably within a minor portion of a revolution, and means controlling said last means for varying the point at which said oscillation occurs with respect to a work piece, including a planetary transmission comprising a ring gear held stationary with respect to the work piece, a sun gear driven by one of said members, and planet gears supporting said oscillating means.

2. A device for drilling a machinable material comprising a rotary drive member, a rotary driven member, means of oscillating said members with respect to each other retractably within a minor portion of a revolution, and means controlling said last means for varying the point at which said oscillation occurs with respect to a work piece, including a planetary transmission comprising a ring gear held stationary with respect to the work piece, a sun gear driven by one of said members, and planet gears supporting said oscillating means, said sun gear being twice the diameter of said ring gear.

3. A device of the class described comprising a rotary drive member, a supported member, a rotary driven member supported in axially sliding driven relation to the drive member, an oscillator for said driven member including a cam element and a follower element, one of said elements being carried by the driven member, and the other of said elements being rotatably mounted with respect to the supporting member, means for rotating said other of said elements at a speed less than the speed of the supported member, said cam and follower elements cooperating to hold the driven member in relatively fixed axial position over a major portion of a revolution and to impart to the driven member an axial oscillation less than .04 of an inch within 90° of a revolution.

4. A device of the class described comprising a rotary drive member, a supported member, a rotary driven member supported in axially sliding driven relation to the drive member, an oscillator for said driven member including a cam element and a follower element, one of said elements being carried by the driven member, and the other of said elements being rotatably mounted with respect to the supporting member, means for rotating said other of said elements at a speed less than the speed of the supported member, said cam and follower elements cooperating to hold the driven member in relatively fixed axial position over a major portion of a revolution and to impart to the driven member an axial oscillation less than .04 of an inch within 90° of a revolution, said holding means including a planetary gearing in which a ring gear is held stationary, the sun gear is driven by one of said members and the planet gear is secured to said other of said elements.

5. A device for drilling machinable material comprising, in combination, a rotary drive member, a rotary driven member supported in axial alignment with said drive member constrained for rotation therewith, means for axially oscillating said members with respect to each other through a small portion of an inch each time within a minor portion of a revolution of said members, means for adjusting said last-mentioned means in timed relation to the rotation of said members to vary the phase of said oscillation with respect to said rotation including a pair of cooperating elements one rotatable with the members and the other rotatable relative thereto, and drive mechanism for rotating said other element.

6. A device for drilling a machinable material comprising, in combination, a support adapted to be constrained against rotation, a drill spindle rotatable and axially reciprocable with respect to said support and adapted to be connected for rotary power drive, means for axially oscillating said spindle with respect to said support through a small portion of an inch each time within a minor portion of a revolution, said means comprising a cam element and a coacting cam follower element, one of said elements being connected to revolve with said spindle and the other of said elements being mounted on said support for revolution about said spindle, and transmission means driven by relative rotation of said spindle and support and connected to revolve said other element with respect to said support at a different speed than the speed of said spindle.

MILTON C. TAYLOR.

REFERENCES CITED

The following references are of record in the file of this patent:

UNITED STATES PATENTS

| Number | Name | Date |
|---|---|---|
| 1,523,629 | Bullock | Jan. 20, 1925 |
| 2,391,463 | Kingsbury | Dec. 25, 1945 |
| 2,418,841 | Karweit | Apr. 15, 1947 |
| 2,453,136 | Karweit | Nov. 9, 1948 |
| 2,453,137 | Karweit | Nov. 9, 1948 |